(12) United States Patent  
Shlens et al.

(10) Patent No.: US 11,508,147 B2
(45) Date of Patent: Nov. 22, 2022

(54) STREAMING OBJECT DETECTION WITHIN SENSOR DATA

(71) Applicant: Google LLC, Mountain View, CA (US)

(72) Inventors: Jonathon Shlens, San Francisco, CA (US); Vijay Vasudevan, Los Altos Hills, CA (US); Jiquan Ngiam, Mountain View, CA (US); Wei Han, Mountain View, CA (US); Zhifeng Chen, Sunnyvale, CA (US); Brandon Chauloon Yang, Saratoga, CA (US); Benjamin James Caine, San Francisco, CA (US); Zhengdong Zhang, Mountain View, CA (US); Christoph Sprunk, Mountain View, CA (US); Ouais Alsharif, Mountain View, CA (US); Junhua Mao, Palo Alto, CA (US); Chen Wu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 440 days.

(21) Appl. No.: 16/812,154

(22) Filed: Mar. 6, 2020

(65) Prior Publication Data
US 2021/0279465 A1 Sep. 9, 2021

(51) Int. Cl.
G06V 20/10 (2022.01)
G06T 17/00 (2006.01)
(Continued)

(52) U.S. Cl.
CPC ............. *G06V 20/10* (2022.01); *G01S 17/89* (2013.01); *G06N 3/0481* (2013.01); *G06T 17/00* (2013.01)

(58) Field of Classification Search
None
See application file for complete search history.

(56) References Cited

U.S. PATENT DOCUMENTS 11,062,454 B1 * 7/2021 Cohen .................. G01S 13/865
2019/0325241 A1 * 10/2019 Nunn ...................... G06V 20/46
(Continued)

OTHER PUBLICATIONS

Chai et al, "Patchwork: A patch-wise attention network for efficient object detection and segmentation in video streams" IEEE Conference on Computer Vision and Pattern Recognition, 2019, 13 pages.
(Continued)

*Primary Examiner* — Delomia L Gilliard
(74) *Attorney, Agent, or Firm* — Fish & Richardson P.C.

(57) ABSTRACT

Methods, systems, and apparatus, including computer programs encoded on a computer storage medium, for processing data generated by a sensing system that rotationally senses an environment. In one aspect, a method comprises partitioning a predetermined period of time into a plurality of sub-periods, wherein the predetermined period of time is a period of time for which data generated by the sensing system constitutes a complete rotational sensing of the environment; for each sub-period: receiving current data generated by the sensing system during the sub-period and characterizing a respective partial scene of the environment; processing the current data using an object detection neural network to generate a current object detection output that is specific to the respective partial scene of the environment.

20 Claims, 5 Drawing Sheets

(51) Int. Cl.
    *G01S 17/89*     (2020.01)
    *G06N 3/04*      (2006.01)

(56) References Cited

U.S. PATENT DOCUMENTS

| | | | | |
|---|---|---|---|---|
| 2020/0349722 A1* | 11/2020 | Schmid | ................ | G06N 3/0481 |
| 2020/0394770 A1* | 12/2020 | Roulet | ...................... | G06T 7/11 |
| 2021/0146952 A1* | 5/2021 | Vora | ......................... | G06N 3/08 |
| 2021/0343022 A1* | 11/2021 | Cohen | .................. | G01S 13/931 |

OTHER PUBLICATIONS

Pinheiro et al, "Recurrent convolutional neural networks for scene labeling" Proceedings of the 31st International Conference on Machine Learning, vol. 32 of Proceedings of Machine Learning Research, Jun. 2014, 9 pages.

Shi et al, "Convolutional lstm network: A machine learning approach for precipitation nowcasting", Advances in neural information processing systems, 2015, 9 pages.

Zhou, et al, "End-to-end multi-view fusion for 3d object detection in lidar point clouds" Conference on Robot Learning (CoRL), 2019, 10 pages.

* cited by examiner

STREAMING OBJECT DETECTION WITHIN SENSOR DATA

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have computer systems that implement neural networks for object classification within data from sensors.

Neural networks, or for brevity, networks, are machine learning models that employ multiple layers of operations to predict one or more outputs from one or more inputs. In some cases, neural networks include one or more hidden layers situated between an input layer and an output layer. The output of each layer is used as input to another layer in the network, e.g., the next hidden layer or the output layer.

SUMMARY

This specification describes how a vehicle, e.g., an autonomous or semi-autonomous vehicle, can use an on-board system to detect objects of certain object categories in an environment surrounding the vehicle. Each object category can specify an object type that is commonly within a vicinity of the vehicle as it travels on a road. For example, object categories can represent pedestrians, cyclists, or other vehicles within a proximity to the vehicle. In particular, the on-board system can be configured to generate, at each sub-period, an object detection output that is specific to a respective partial scene of the environment. The time length of each sub-period is smaller, and usually much smaller, than the time length required for a sensor that rotationally senses an environment to generate data which constitutes a complete rotational sensing of the environment.

In general, one innovative aspect of the subject matter described in this specification can be embodied in methods that include the actions of partitioning a predetermined period of time into a plurality of sub-periods, wherein the predetermined period of time is a period of time for which data generated by a sensing system that rotationally senses an environment constitutes a complete rotational sensing of the environment; for each sub-period: receiving current data generated by the sensing system during the sub-period and characterizing a respective partial scene of the environment; processing the current data using an object detection neural network to generate a current object detection output that is specific to the respective partial scene of the environment, wherein the object detection neural network comprises: a sequential processing subnetwork that processes (i) a current sequential processing subnetwork input and (ii) a preceding sequential processing subnetwork output that is generated by the sequential processing subnetwork from a preceding sub-period, to generate a current sequential processing subnetwork output; and an object detection subnetwork that processes, for the current data received, (i) the current sequential processing subnetwork output and (ii) a preceding object detection output that is generated by the object detection subnetwork from the preceding sub period, to generate the current object detection output.

In some implementations, the object detection neural network further comprises a featurization subnetwork that process the current data generated by the sensing system for the sub-period to generate a current intermediate representation; and the object detection subnetwork is also configured to process the current intermediate representation when generating the current object detection output.

In some implementations, the current sequential processing subnetwork input is the current intermediate representation.

In some implementations, the environment is an environment in a vicinity of a vehicle, and wherein the sensing system is on-board the vehicle.

In some implementations, the sensing system comprises a spinning LIDAR sensor, and wherein the data is three-dimensional point cloud data.

In some implementations, the object detection output comprises: (i) data defining one or more bounding boxes in the current data generated by the spinning sensor in the sub period, and (ii) for each of the one or more bounding boxes, a respective confidence score that represents a likelihood that an object belonging to an object category from a set of one or more object categories is present in the region of the environment shown in the bounding box.

In some implementations, partitioning the predetermined period of time into the plurality of sub-periods comprises: determining a plurality of candidate sub-periods that are each of different time lengths from each other; computing, for each candidate sub-period, a respective ratio of (i) a time length of the candidate sub-period to (ii) a time length required for processing the current data that is generated by the sensing system during the candidate sub-period using the object detection neural network; determining, based at least on the respective ratios, a determined time length of the sub-period; and partitioning the predetermined period of time into the plurality of sub-periods to each have the determined time length.

In some implementations, determining the determined time length of the sub-period further comprises, for each candidate sub-period: determining that a measure of accuracy of the current object detection output satisfies a predetermined detection accuracy threshold.

Particular embodiments of the subject matter described in this specification can be implemented so as to realize one or more of the following advantages.

By processing sensor data in this manner, the on-board system can generate timely and accurate object detection data, even when the computational resources available on-board the vehicle are limited, or when the system operates with great latency, e.g., because completing each rotational sensing of an environment to generate sensor data, detecting objects within the sensor data, or both requires a significant amount of time. In other words, the system can use the techniques to reduce the operational latency in generating object detection outputs which specify objects that are identified and classified within sensor data. The system can also use the techniques to optimize (e.g., balance) resource usage in generating such object detection outputs. More importantly, appropriate planning decisions can then be made based on the object detection outputs in order to cause the vehicle to travel along a safe and comfortable trajectory.

In addition, the on-board system can apply the techniques to determine a specific time length for each sub-period. Determining the time length involves evaluating multiple candidate sub-periods that are each of different time lengths from each other and selecting the time length for which both operational latency and object detection accuracy can satisfy corresponding criteria. As such, the techniques further allows the system to specifically select the time length that facilitates optimal operation of the system.

BRIEF DESCRIPTION OF THE DRAWINGS

Like reference numbers and designations in the various drawings indicate like elements.

DETAILED DESCRIPTION

Figure 1:
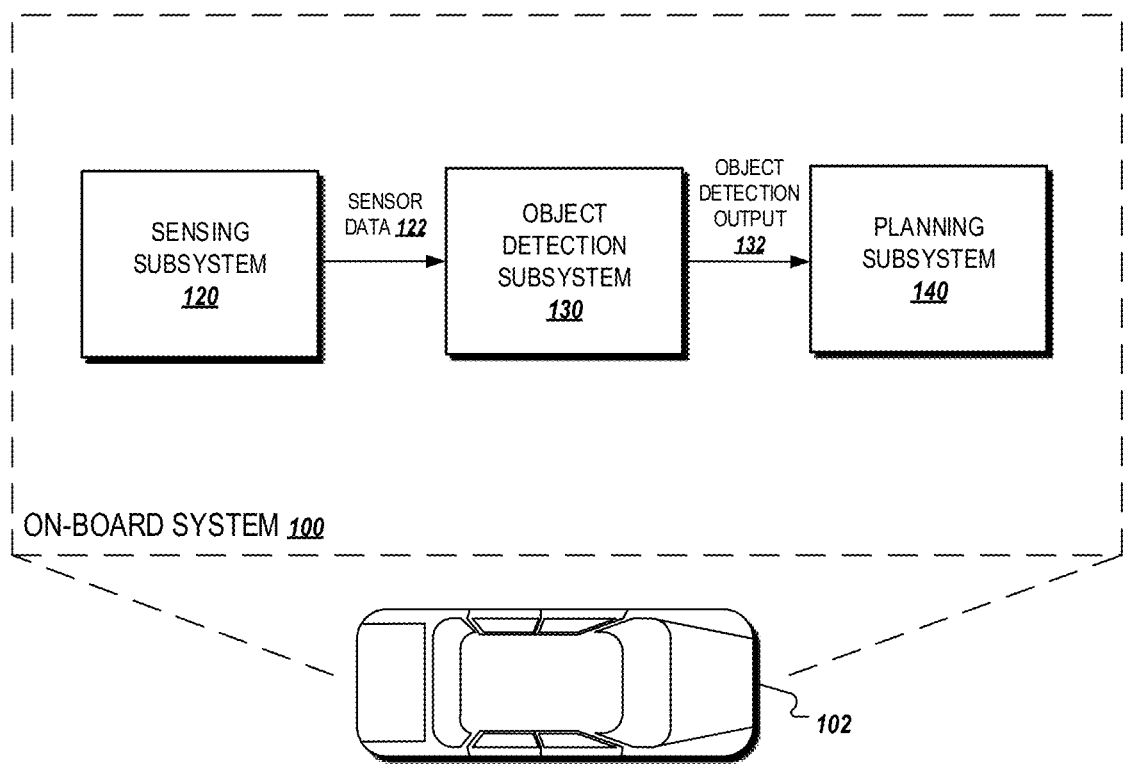
FIG. 1 is a block diagram of an example of a system.

This specification describes how a system, e.g., an object detection system in an autonomous or semi-autonomous vehicle, can use one or more machine learning models to automatically detect objects of certain object categories in an environment surrounding the system. Each object category can specify an object type that is commonly within a vicinity of the vehicle. For example, object categories can represent pedestrians, cyclists, or other vehicles within a proximity to the vehicle.

A machine learning model is said to be "fully-learned" if the model has been trained to compute a desired prediction. In other words, a fully-learned model generates an output based solely on being trained on training data rather than on human-programmed decisions. For convenience, the machine learning models, including neural networks, as used in throughout this description will generally refer to fully-learned ones.

To make such object detection predictions, the object detection system can use sensor data generated by a sensing system that rotationally senses the environment surrounding the vehicle. For example, the sensing system can include a spinning LIDAR sensor that generates as output three-dimensional point cloud data. In order for a planning system of the vehicle to generate planning decisions which cause the vehicle to travel along a safe and comfortable trajectory, the planning system must be provided with timely and accurate detection predictions for objects in the vicinity of the vehicle.

Therefore, the object detection system is configured to generate, at each sub-period, an object detection output that is specific to a respective partial scene of the environment. The time length of each sub-period is smaller, and usually much smaller, than the time length required for the sensing system that rotationally senses an environment to generate data which constitutes a complete rotational sensing of the environment.

In this manner, the object detection system can generate timely and accurate object prediction data, even when the computational resources available on-board the vehicle are limited, or when the sensing system operates with great latency, e.g., requires a significant amount of time to complete each rotational sensing of an environment.

In operation, the object detection system partitions a predetermined period of time into a plurality of sub-periods. The predetermined period of time is a period of time for which data generated by a sensing system that rotationally senses an environment constitutes a complete rotational sensing of the environment.

For each sub-period of the plurality of sub-periods, the system receives current data generated by the sensing system during the sub-period and characterizing a respective partial scene of the environment.

The system processes the current data using an object detection neural network to generate a current object detection output that is specific to the respective partial scene of the environment. In brief, the object detection neural network includes a sequential processing subnetwork and an object detection subnetwork.

Specifically, the system uses the sequential processing subnetwork to process (i) a current sequential processing subnetwork input and (ii) a preceding sequential processing subnetwork output that is generated by the sequential processing subnetwork from a preceding sub-period to generate a current sequential processing subnetwork output.

The system then uses the object detection subnetwork to process, for the current data received, (i) the current sequential processing subnetwork output and (ii) a preceding object detection output that is generated by the object detection subnetwork from the preceding sub period to generate the current object detection output.

In some implementations, to assist in the object detection prediction, the object detection neural network also includes a featurization subnetwork that is configured to generate respective intermediate representations of subnetwork inputs. The intermediate representations typically include data specifying identified features of objects that are characterized by the subnetwork inputs. In these implementations, the object detection neural network further includes a featurization subnetwork that process the current data generated by the sensing system for the sub-period to generate a current intermediate representation. The object detection subnetwork is also configured to process the current intermediate representation when generating the current object detection output.

These features and additional features are described in more detail below.

FIG. 1 is a block diagram of an example on-board system 100. The on-board system 100 is physically located on-board a vehicle 102. The vehicle 102 in FIG. 1 is illustrated as an automobile, but the on-board system 100 can be located on-board any appropriate vehicle type. The vehicle 102 can be a fully autonomous vehicle that uses object detection predictions to inform fully-autonomous driving decisions. The vehicle 102 can also be a semi-autonomous vehicle that uses object detection predictions to aid a human driver. For example, the vehicle 102 can autonomously apply the brakes if a full-vehicle prediction indicates that a human driver is about to collide with a detected object, e.g., a pedestrian, a cyclist, another vehicle. As another example, besides an automobile, the vehicle 102 can be a watercraft or an aircraft. Moreover, the on-board system 100 can include components additional to those depicted in FIG. 1 (e.g., a control subsystem or a user interface subsystem).

The on-board system 100 includes a sensing subsystem 120 which enables the on-board system 100 to "see" the environment in a vicinity of the vehicle 102. The sensing subsystem 120 includes one or more sensors, some of which are configured to receive reflections of electromagnetic radiation from the environment in the vicinity of the vehicle 102. For example, the sensing subsystem 120 can include one or more laser sensors (e.g., LIDAR laser sensors) that are configured to detect reflections of laser light. As another example, the sensing subsystem 120 can include one or more radar sensors that are configured to detect reflections of radio waves. As another example, the sensing subsystem 120 can include one or more camera sensors that are configured to detect reflections of visible light.

The sensing subsystem 120 repeatedly (i.e., at each of multiple time points) uses raw sensor measurements, data derived from raw sensor measurements, or both to generate sensor data 122. The raw sensor measurements indicate the directions, intensities, and distances travelled by reflected radiation. For example, a sensor in the sensing subsystem 120 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The exact types or formats of the sensor data 122 may vary, but generally, the sensor data characterizes a latest state of an environment (i.e., an environment at the current time point) in the vicinity of the vehicle 102.

The on-board system 100 can provide the sensor data 122 generated by the sensing subsystem 120 to an object detection subsystem 130 for use in generating object detection outputs 132.

In brief, the object detection subsystem 130 implements components that identify objects within a vicinity of the vehicle. For example, the object detection output 132 can include data defining one or more bounding boxes in the sensor data 122, and for each of the one or more bounding boxes, a respective confidence score that represents a likelihood that an object belonging to an object category from a set of one or more object categories is present in the region of the environment shown in the bounding box. As described above, examples of object categories include pedestrians, cyclists, or other vehicles near the vicinity of the vehicle 102 as it travels on a road.

The on-board system 100 can provide the object detection outputs 132 to a planning subsystem 140. When the planning subsystem 140 receives the object detection outputs 132, the planning subsystem 140 can use the object detection outputs 132 to generate planning decisions which plan the future trajectory of the vehicle 102. The planning decisions generated by the planning subsystem 140 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. The planning decisions generated by the planning subsystem 140 can be provided to a control system (not shown in the figure) of the vehicle 102. The control system of the vehicle can control some or all of the operations of the vehicle by implementing the planning decisions generated by the planning system. For example, in response to receiving a planning decision to apply the brakes of the vehicle, the control system of the vehicle 102 may transmit an electronic signal to a braking control unit of the vehicle. In response to receiving the electronic signal, the braking control unit can mechanically apply the brakes of the vehicle.

In order for the planning subsystem 140 to generate planning decisions which cause the vehicle 102 to travel along a safe and comfortable trajectory, the on-board system 100 must provide the planning subsystem 140 with timely and accurate object detection outputs 132. In various cases, however, the manner of which the sensing subsystem 120 operates greatly inhibits timely object detection. This is because, conventionally, the sensing subsystem 120 refrains from identifying objects until receiving every sensor data that constitutes a complete sensing of the environment. For example, if the sensing subsystem 120 includes a type of sensors that rotationally sense the environment, then the components within the object detection subsystem 130 typically have to wait until the sensors complete every entire rotational sensing of the environment ("rotation cycle") before beginning to identify objects within the sensor data. Depending on actual sensor configurations, in this example, the range of each entire rotational sensing can have any value between 0 to 360 degrees.

As such, to improve overall efficiency, the object detection subsystem 130 is configured to detect objects in the environment by leveraging the manner of which such sensors operate. In brief, the object detection subsystem 130 can generate, at each sub-period, an object detection output that is specific to a respective partial scene of the environment. The time length of each sub-period is smaller, and usually much smaller, than the time length required for a sensor that rotationally senses the environment to generate data which constitutes a complete rotational sensing of the environment.

In particular, the object detection subsystem 130 can do so by implementing an object detection neural network which, in turn, includes an object detection subnetwork, a sequential processing subnetwork, and, optionally, a featurization subnetwork. These components and operations performed by these components are depicted in FIGS. 2-3 and described in detail below.

Figure 2:
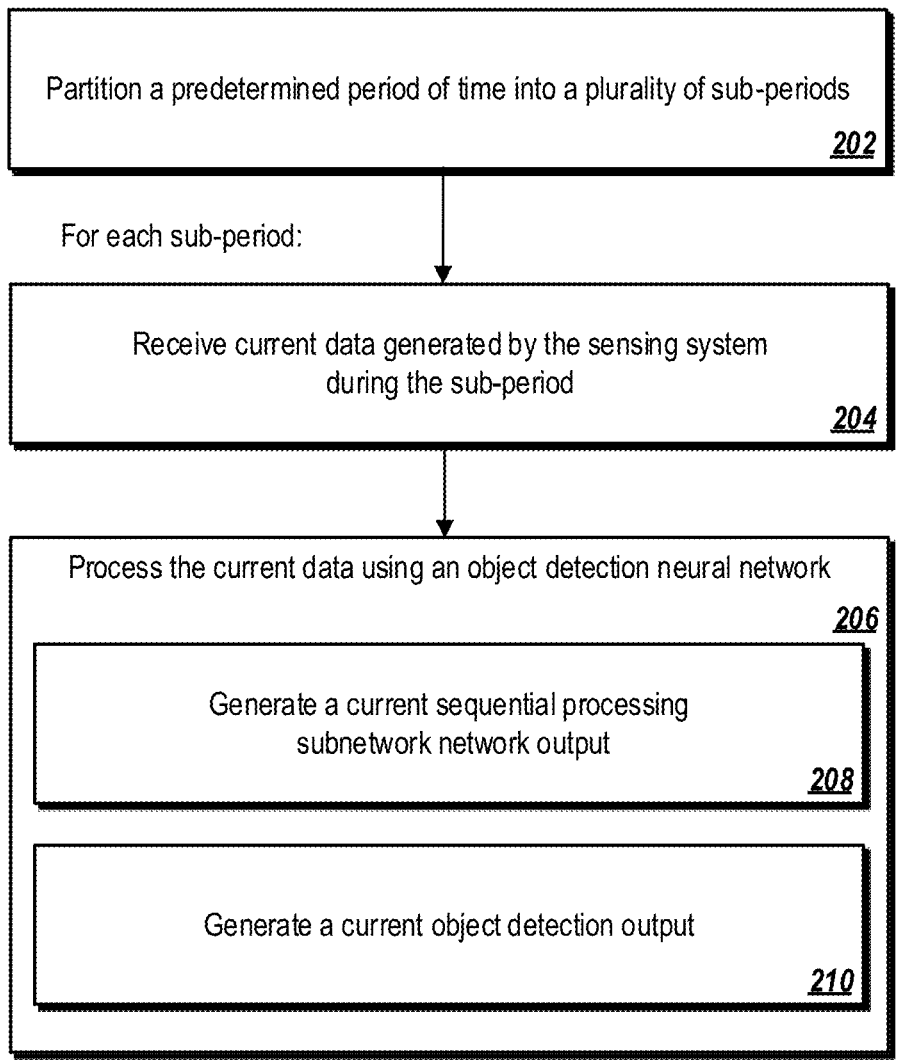
FIG. 2 is a flow chart of an example of a process for performing object detection.

FIG. 2 is a flow chart of an example of a process 200 for performing object detection. For convenience, the process 200 will be described as being performed by a system of one or more computers located in one or more locations. For example, a system, e.g., the on-board system 100 of FIG. 1, appropriately programmed in accordance with this specification, can perform the process 200.

The system partitions a predetermined period of time into a plurality of sub-periods (202). For example, a partitioner 301, which can be a hardware or software process that outputs the sensor data for each of the plurality of sub-time periods, can be used. The predetermined period of time is a period of time for which data generated by a sensing system that rotationally senses an environment constitutes a complete rotational sensing of the environment. In other words, the system repeatedly, i.e., at each of multiple time points separated by the predetermined period of time, receives sensor data characterizing a region in the environment.

Figure 3A:
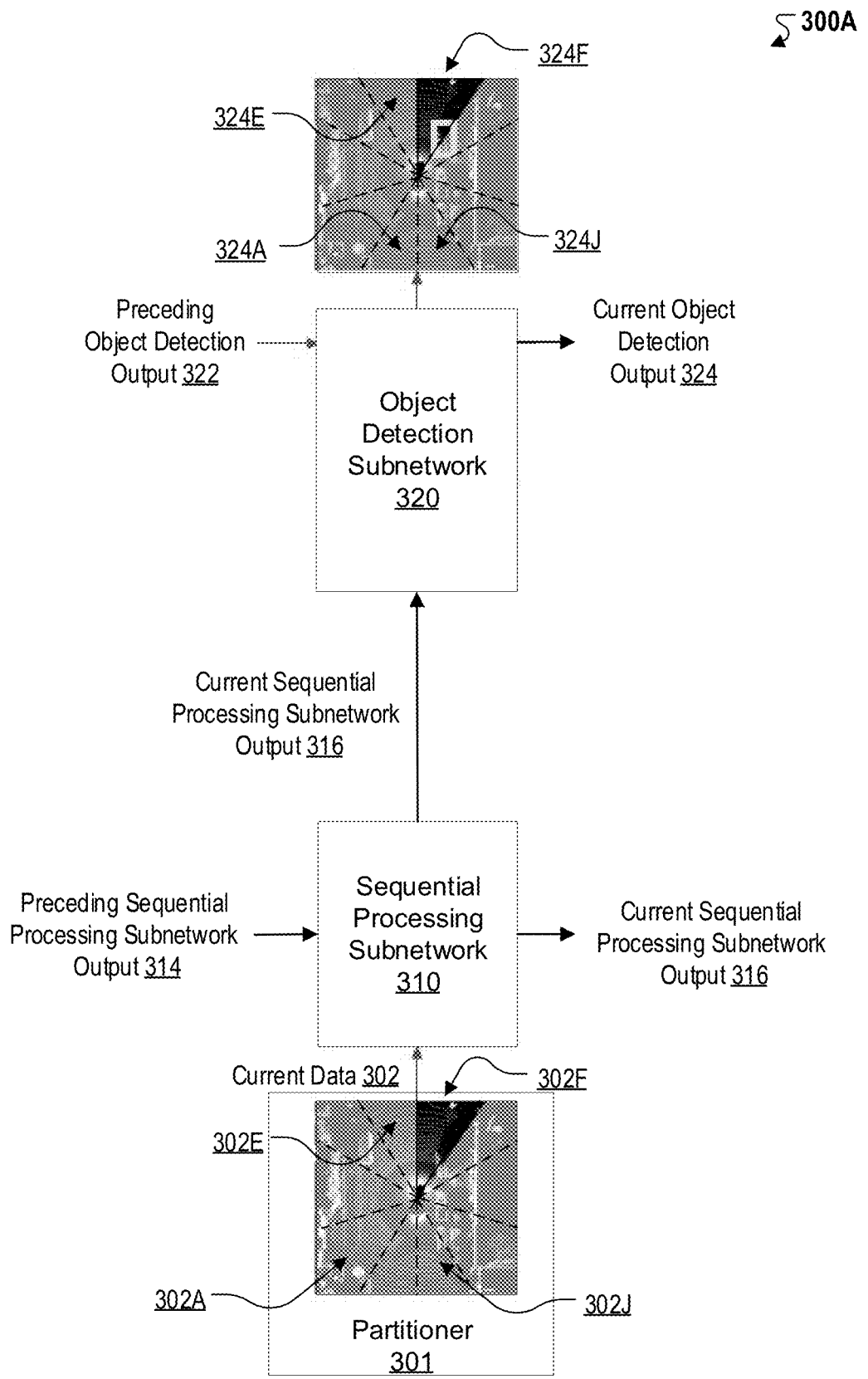
FIGS. 3A-B are schematic diagrams of example components of an object detection neural network.

FIG. 3A is a schematic diagram 300A of example components of the object detection neural network. As illustrated in FIG. 3A, for example, the sensor data 312 includes three-dimensional point cloud data generated from a spinning LIDAR sensor mounted atop a vehicle. Correspondingly, the sensor data 312 characterizes a region of an environment surrounding the vehicle.

While the system can perform the partition in accordance with any appropriate partitioning schemes, advantageously, the partitioner 301 partitions the predetermined period of time into multiple sub-periods to each have a same time length that is smaller than the length of the predetermined period of time. Determining such time length typically involves evaluating a plurality of candidate sub-periods that are each of different time lengths from each other.

Figure 4:
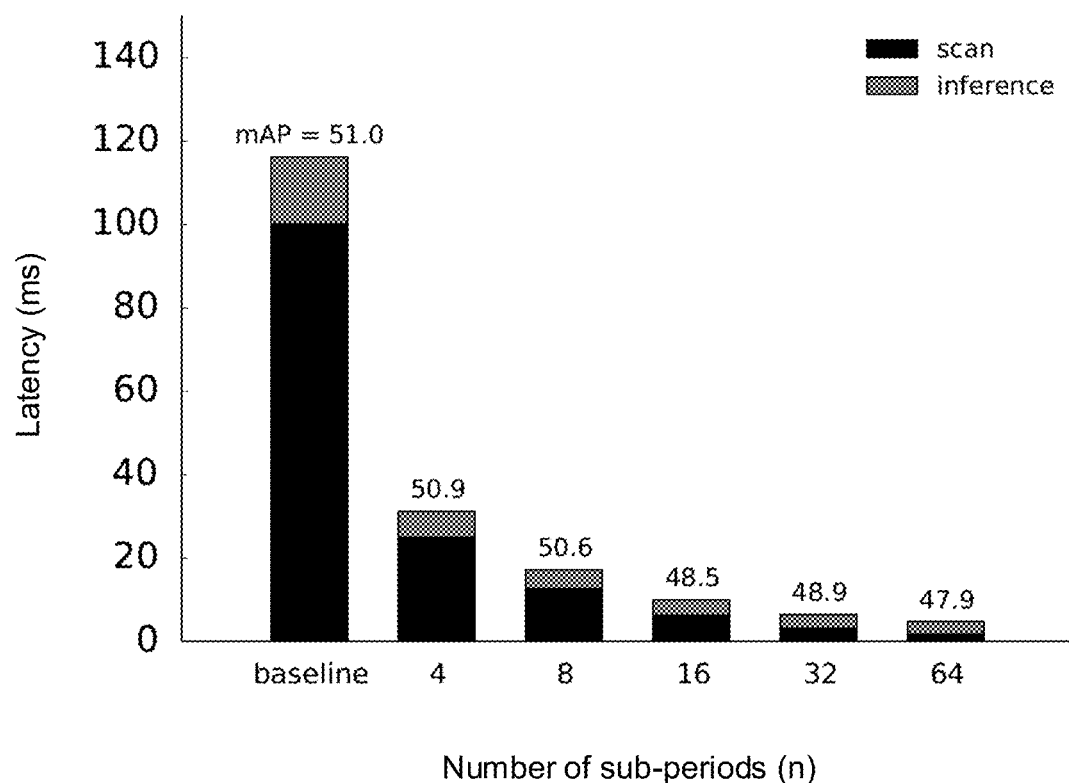
FIG. 4 shows example comparisons between sub-periods that are each of different time lengths from each other.

In some implementations, the system selects a time length that can facilitate optimal object detection. That is, the system determines the time length for which a measure of accuracy of the current object detection output satisfies a predetermined detection accuracy threshold. FIG. 4 shows example comparisons between sub-periods that are each of different time lengths from each other. In the example of FIG. 4, the predetermined time length is 100 ms and the time lengths for the candidate sub-periods are 25 ms (i.e., if the predetermined time length were to be partitioned into 4 sub-periods), 12.5 ms, 6.25 ms, 3.125 ms, and 1.5625 ms, respectively. In addition, in this example, the measure of accuracy is evaluated using mean average precision (mAP) metric and the predetermined detection accuracy threshold specifies that the object detection outputs must have mAP scores greater than 50.0. Accordingly, in this example, the system can select 25 ms or 12.5 ms as the determined time length for each sub-period.

In some implementations, the system selects a time length that can reduce latency and to facilitate streamlined operation of the system. In general, the term "latency" refers to the time interval between a measurement and a detection. As such, the latency can be computed as a sum of (i) the predetermined time length (i.e., the period of time for which data generated by the sensing system that rotationally senses an environment constitutes a complete rotational sensing of the environment) and (ii) the time needed for processing the sensor data to generate a corresponding object detection output. In more detail, in these implementations, for each candidate sub-period, the system computes a respective ratio of (i) a time length of the candidate sub-period ("scan time") to (ii) a time length required for processing the current data that is generated by the sensing subsystem during the candidate sub-period using the object detection subsystem ("inference time"). The system then selects a determined time length of the sub-period based at least on the respective ratios. For example, the system selects the time length associated with a ratio that is close to 1.0 in order to effectively balance the usage of on-board computational resources between scanning and inference stages and, in turn, reduce overall latency. In the example of FIG. 4, the system can select 3.125 ms (i.e., if the predetermined time length were to be partitioned into 32 sub-periods) as the determined time length for each sub-period.

Once the time length has been determined, the system proceeds to partition the predetermined period of time into the plurality of sub-periods to each have the determined time length. For each sub-period, briefly, the system receives current data generated by the sensing subsystem during the sub-period (204) and processes the current data using an object detection neural network to generate a current object detection output that is specific to the respective partial scene of the environment (206). For example, as illustrated in FIG. 3A, the system partitions the predetermined period of time (e.g., 100 ms) into a total of ten sub-periods (e.g., 10 ms each). For each sub-period, the system receives respective current data (e.g., current data 302A) that is generated by the sensing subsystem during the sub-period.

In more detail, for each sub-period, the system receives current data (204) that is generated by the sensing system during the sub-period and that characterizes a respective partial scene of the environment.

The system processes the current data using an object detection neural network (206). As depicted in FIG. 3A, the object detection neural network includes a sequential processing subnetwork 310 and an object detection subnetwork 320. The object detection subnetwork 320 can be any appropriate neural network that has been trained to make predictions related to object detection, i.e., related to detecting objects in the environment surrounding the vehicle. The sequential processing subnetwork 310 can be any appropriate neural network that has been trained to assist in the object detection by maintaining a memory of data received over preceding sub-periods.

The system generates a current sequential processing subnetwork output (208) by using the sequential processing subnetwork. The sequential processing subnetwork is configured to process (i) a current sequential processing subnetwork input and (ii) a preceding sequential processing subnetwork output that is generated by the sequential processing subnetwork from a preceding sub-period, to generate a current sequential processing subnetwork output. In particular, in the example of FIG. 3A, the current sequential processing subnetwork input is the current data that is generated by the sensing subsystem for the current sub-period and that characterizes a respective partial scene of the environment.

In some implementations, the sequential processing subnetwork is a recurrent neural network that includes one or more recurrent neural network layers. For example, the recurrent layers in the sequential processing subnetwork can be long-short term memory (LSTM) layers or gated recurrent unit (GRU) layers. Each layer in turn includes one or more memory cells. For example, each LSTM layer can include one or more memory cells that each include an input gate, a forget gate, and an output gate that allow the cell to store previous states for the cell, e.g., for use in generating a current activation or to be provided to other components of the LSTM neural network.

In the example of FIG. 3A, the system uses the sequential processing subnetwork 310 to process current data 302F that is generated by the sensing subsystem for a particular sub-period in the plurality of sub-periods. For the particular sub-period, the sequential processing subnetwork 310 receives as input (i) the current data 302F and (ii) a preceding sequential processing subnetwork output 314, and generates a current sequential processing subnetwork output 316. In particular, the preceding sequential processing subnetwork output 314 is the output that was generated by the sequential processing subnetwork 310 for a preceding sub-period, i.e., the sub-period for which the sensing subsystem generates current data 302E.

Thus, to generate a corresponding sequential processing subnetwork output for each sub-period, the system provides as input to the sequential processing subnetwork (i) a current sequential processing subnetwork input and (ii) a preceding sequential processing subnetwork output. For the very first sub-period, because there is no preceding sequential processing subnetwork output, the system can instead provide a predetermined placeholder input. The sequential processing subnetwork then processes the predetermined placeholder input and the current subnetwork input to generate the current sequential processing subnetwork output corresponding to the first sub-period.

The system also generates a current object detection output (210) by using the object detection subnetwork. The object detection subnetwork is configured to process (i) the current sequential processing subnetwork output and (ii) a preceding object detection output that is generated by the object detection subnetwork from the preceding sub-period, to generate the current object detection output. The current object detection output includes data identifying objects within the partial scene of the environment that is characterized by the current data.

The object detection subnetwork is a neural network that includes one or more neural network layers. For example, the layers in the object detection subnetwork can be fully connected layers or convolutional layers. The object detection subnetwork can identify candidate regions within the environment characterized by the input data that are predicted to include specific objects of interest using regression techniques. For example, the input data can include image data, video data, or other two-dimensional (2D) or 3D data. The object detection subnetwork then generates bounding boxes that specify the boundaries of the candidate regions. Optionally, the object detection subnetwork also generates, for each of the bounding boxes, a respective confidence score that represents a likelihood that an object belonging to an object category from a set of one or more object categories is present in the region of the environment shown in the bounding box.

In the example of FIG. 3A, the system uses the object detection subnetwork 320 to process current sequential processing subnetwork output 316 that is generated by the sequential processing subnetwork 310 for the particular sub-period, i.e., the sub-period for which the sensing subsystem generates current data 302F. For the particular sub-period, the object detection subnetwork 320 receives as input (i) the current sequential processing subnetwork output 316 and (ii) a preceding object detection output 322, and generates a current object detection output 324F. In particular, the preceding object detection output 322 is the output that was generated by the object detection subnetwork 320 for the preceding sub-period, i.e., the sub-period for which the sensing subsystem generates current data 302E.

Thus, to generate a corresponding object detection subnetwork output for each sub-period, the system provides as input to the object detection subnetwork (i) a current sequential processing subnetwork output and (ii) a preceding object detection output. As similarly described above, for the very first sub-period, because there is no preceding object detection output, the system can instead provide a predetermined placeholder input. The object detection subnetwork then processes the predetermined placeholder input and the current sequential processing subnetwork output to generate the current object detection output corresponding to the first sub-period.

In some implementations, the system also includes a featurization subnetwork that can extract or derive features from input data using featurization techniques. Each feature typically includes one or more numeric values that represent a specific property or characteristic of the input data. As such, the featurization subnetwork can assist in the object detection by providing the object detection subnetwork with information about such features. For example, the information can include geometric, volumetric, or semantic features of respective objects characterized by the input data. As another example, the information can include object proposal, i.e., proposed regions in the environment that are likely to include the specific objects of interest.

Figure 3B:
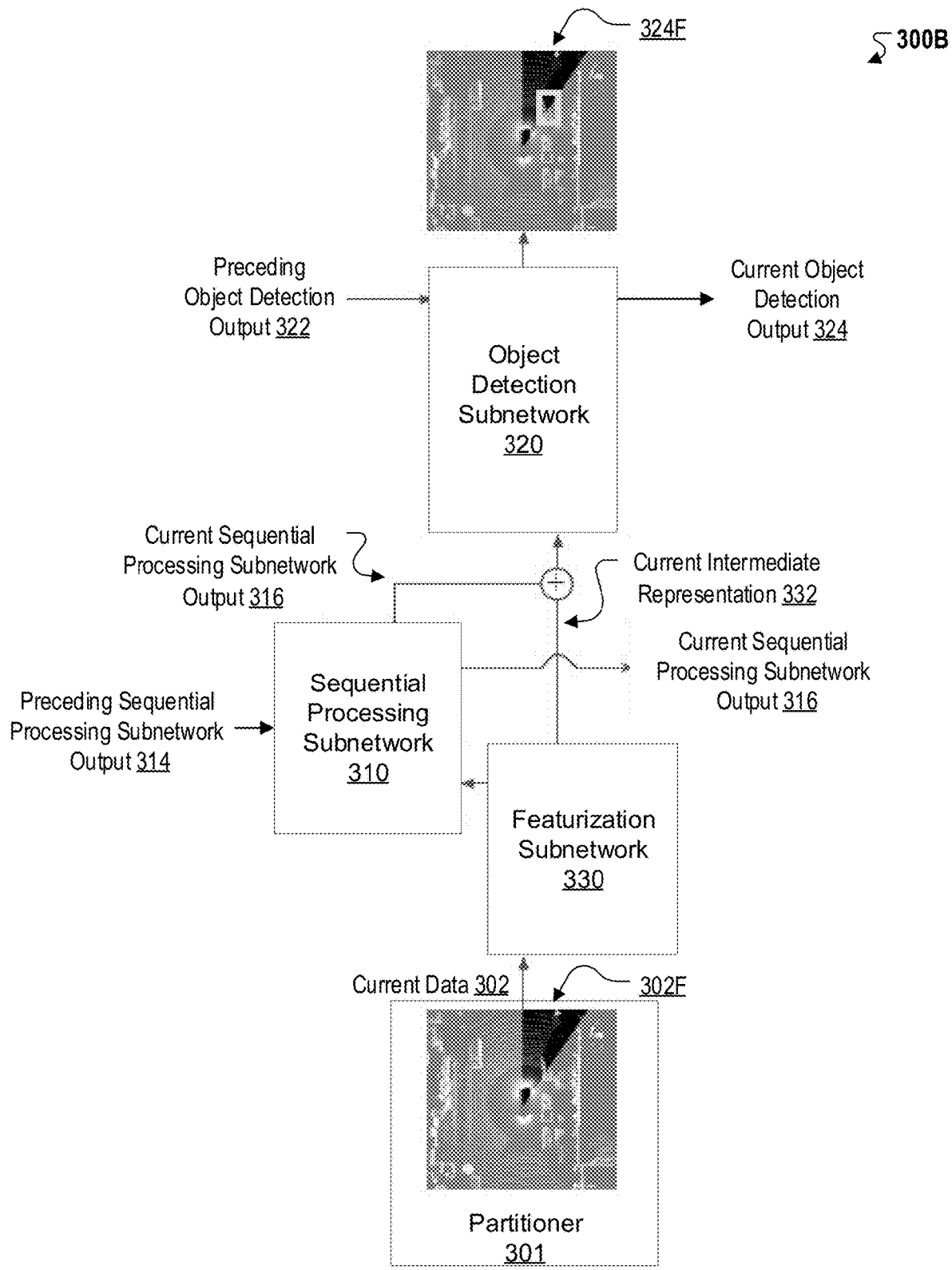

For example, as depicted in FIG. 3B, the system includes a featurization subnetwork 330 that is configured to process current data 302 that is generated by the sensing subsystem for each sub-period to generate a current intermediate representation 332 which is in the form of a fixed-size multi-dimensional array of data values. In particular, these data values are numeric values that correspond to respective features of the current data 302.

FIG. 3B is a schematic diagram 300B of example components of the object detection neural network. In the example of FIG. 3B, the system uses the featurization subnetwork 330 to process the current data 302F that is generated by the sensing subsystem for the particular sub-period, and generate a current intermediate representation 332. The system provides the current intermediate representation 332 to the sequential processing subnetwork 310. The sequential processing subnetwork 310 receives as input (i) the current intermediate representation 332 and (ii) a preceding sequential processing subnetwork output 314, and generates a current sequential processing subnetwork output 316. The system then combines, e.g., computes a sum between, the current intermediate representation 332 and the current sequential processing subnetwork output 316 and provides the combination to the object detection subnetwork 320. The object detection subnetwork 320 receives as input (i) the combination and (ii) a preceding object detection output 322, and generates a current object detection output 324F. The current object detection output 324F identifies objects within the partial scene of the environment that is characterized by the current data 302F.

Thus, in implementations where the featurization subnetwork is used to assist in the object detection by generating intermediate representations based on current data, the system can provide the intermediate representations instead of, or in addition to, the current data as inputs to the sequential processing subnetwork. Similarly, the system can provide the intermediate representations instead of, or in addition to, the current sequential processing subnetwork outputs as inputs to the object detection subnetwork. The provision of such intermediate representations can further improve the performance of the system on object detection.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of processing data, comprising:
partitioning a predetermined period of time into a plurality of sub-periods, wherein the predetermined period of time is a period of time for which data generated by a sensing system that rotationally senses an environment constitutes a complete rotational sensing of the environment;
for each sub-period:
receiving current data generated by the sensing system during the sub-period and characterizing a respective partial scene of the environment;
processing the current data to generate a current object detection output that is specific to the respective partial scene of the environment, wherein the processing comprises:
processing (i) a current sequential processing subnetwork input and (ii) a preceding sequential processing subnetwork output that is generated by a sequential processing subnetwork from a preceding sub-period, to generate a current sequential processing subnetwork output; and
processing, for the current data received, (i) the current sequential processing subnetwork output and (ii) a preceding object detection output that is generated by an object detection subnetwork from the preceding sub period, to generate the current object detection output.

2. The method of claim 1, further comprising:
processing the current data generated by the sensing system for the sub-period to generate a current intermediate representation; and
processing, by the object detection subnetwork, the current intermediate representation when generating the current object detection output.

3. The method of claim 1, wherein the current sequential processing subnetwork input is the current intermediate representation.

4. The method of claim 1, wherein the environment is an environment in a vicinity of a vehicle, and wherein the sensing system is on-board the vehicle.

5. The method of claim 1, wherein the sensing system comprises a spinning LIDAR sensor, and wherein the data is three-dimensional point cloud data.

6. The method of claim 1, wherein the object detection output comprises: (i) data defining one or more bounding boxes in the current data generated by the spinning sensor in the sub period, and (ii) for each of the one or more bounding boxes, a respective confidence score that represents a likelihood that an object belonging to an object category from a set of one or more object categories is present in the region of the environment shown in the bounding box.

7. The method of claim 1, wherein partitioning the predetermined period of time into the plurality of sub-periods comprises:
determining a plurality of candidate sub-periods that are each of different time lengths from each other;
computing, for each candidate sub-period, a respective ratio of (i) a time length of the candidate sub-period to (ii) a time length required for processing the current data that is generated by the sensing system during the candidate sub-period using the object detection neural network;
determining, based at least on the respective ratios, a determined time length of the sub-period; and
partitioning the predetermined period of time into the plurality of sub-periods to each have the determined time length.

8. The method of claim 7, wherein determining the determined time length of the sub-period further comprises, for each candidate sub-period:
determining that a measure of accuracy of the current object detection output satisfies a predetermined detection accuracy threshold.

9. A system comprising one or more computers and one or more storage devices storing instructions that, when executed by the one or more computers, cause the one or more computers to implement:
a partitoner that partitions a predetermined period of time into a plurality of sub-periods, wherein the predetermined period of time is a period of time for which data generated by a sensing system that rotationally senses an environment constitutes a complete rotational sensing of the environment, and generates, for each sub-period, current data generated by the sensing system during the sub-period and characterizing a respective partial scene of the environment; and
an object detection neural network that processes, for each sub-period, the current data using an object detection neural network to generate a current object detection output that is specific to the respective partial scene of the environment, wherein the object detection neural network comprises:
a sequential processing subnetwork that processes (i) a current sequential processing subnetwork input and (ii) a preceding sequential processing subnetwork output that is generated by the sequential processing subnetwork from a preceding sub-period, to generate a current sequential processing subnetwork output; and an object detection subnetwork that processes, for the current data received, (i) the current sequential processing subnetwork output and (ii) a preceding object detection output that is generated by the object detection subnetwork from the preceding sub period, to generate the current object detection output.

10. The system of claim 9, wherein:
the object detection neural network further comprises a featurization subnetwork that process the current data generated by the sensing system for the sub-period to generate a current intermediate representation; and
the object detection subnetwork is also configured to process the current intermediate representation when generating the current object detection output.

11. The system of claim 9, wherein the current sequential processing subnetwork input is the current intermediate representation.

12. The system of claim 9, wherein the environment is an environment in a vicinity of a vehicle, and wherein the sensing system is on-board the vehicle.

13. The system of claim 9, wherein the sensing system comprises a spinning LIDAR sensor, and wherein the data is three-dimensional point cloud data.

14. The system of claim 9, wherein the partitioner partitions the predetermined period of time into the plurality of sub-periods by performing operations comprising:
determining a plurality of candidate sub-periods that are each of different time lengths from each other;
computing, for each candidate sub-period, a respective ratio of (i) a time length of the candidate sub-period to (ii) a time length required for processing the current data that is generated by the sensing system during the candidate sub-period using the object detection neural network;
determining, based at least on the respective ratios, a determined time length of the sub-period; and
partitioning the predetermined period of time into the plurality of sub-periods to each have the determined time length.

15. The system of claim 9, wherein determining the determined time length of the sub-period further comprises, for each candidate sub-period:
determining that a measure of accuracy of the current object detection output satisfies a predetermined detection accuracy threshold.

16. One or more non-transitory computer-readable storage media storing instructions that when executed by one or more computers cause the one or more computers to perform operations comprising:
partitioning a predetermined period of time into a plurality of sub-periods, wherein the predetermined period of time is a period of time for which data generated by a sensing system that rotationally senses an environment constitutes a complete rotational sensing of the environment;

for each sub-period:
receiving current data generated by the sensing system during the sub-period and characterizing a respective partial scene of the environment;
processing the current data using an object detection neural network to generate a current object detection output that is specific to the respective partial scene of the environment, wherein the object detection neural network comprises:
a sequential processing subnetwork that processes (i) a current sequential processing subnetwork input and (ii) a preceding sequential processing subnetwork output that is generated by the sequential processing subnetwork from a preceding sub-period, to generate a current sequential processing subnetwork output; and
an object detection subnetwork that processes, for the current data received, (i) the current sequential processing subnetwork output and (ii) a preceding object detection output that is generated by the object detection subnetwork from the preceding sub period, to generate the current object detection output.

17. The non-transitory computer storage media of claim 16, wherein:
the object detection neural network further comprises a featurization subnetwork that process the current data generated by the sensing system for the sub-period to generate a current intermediate representation; and
the object detection subnetwork is also configured to process the current intermediate representation when generating the current object detection output.

18. The non-transitory computer storage media of claim 16, wherein the current sequential processing subnetwork input is the current intermediate representation.

19. The non-transitory computer storage media of claim 16, wherein partitioning the predetermined period of time into the plurality of sub-periods comprises:
determining a plurality of candidate sub-periods that are each of different time lengths from each other;
computing, for each candidate sub-period, a respective ratio of (i) a time length of the candidate sub-period to (ii) a time length required for processing the current data that is generated by the sensing system during the candidate sub-period using the object detection neural network;
determining, based at least on the respective ratios, a determined time length of the sub-period; and
partitioning the predetermined period of time into the plurality of sub-periods to each have the determined time length.

20. The non-transitory computer storage media of claim 16, wherein determining the determined time length of the sub-period further comprises, for each candidate sub-period:
determining that a measure of accuracy of the current object detection output satisfies a predetermined detection accuracy threshold.

* * * * *